US010930079B1

(12) United States Patent
Côté et al.

(10) Patent No.: US 10,930,079 B1
(45) Date of Patent: Feb. 23, 2021

(54) TECHNIQUES FOR DISPLAYING AUGMENTATIONS THAT REPRESENT CADASTRAL LINES AND OTHER NEAR-GROUND FEATURES

(71) Applicant: Bentley Systems, Incorporated, Exton, PA (US)

(72) Inventors: Stéphane Côté, Lac Beauport (CA); Marc-André Bouvrette, Québec (CA); Danny Lebel, Québec (CA)

(73) Assignee: Bentley Systems, Incorporated, Exton, PA (US)

( * ) Notice: Subject to any disclaimer, the term of this patent is extended or adjusted under 35 U.S.C. 154(b) by 86 days.

(21) Appl. No.: 16/248,257

(22) Filed: Jan. 15, 2019

(51) Int. Cl.
*G06T 19/00* (2011.01)
*G06T 19/20* (2011.01)
*G09B 29/00* (2006.01)

(52) U.S. Cl.
CPC ............ *G06T 19/006* (2013.01); *G06T 19/20* (2013.01); *G09B 29/005* (2013.01); *G09B 29/007* (2013.01); *G06T 2219/2004* (2013.01)

(58) Field of Classification Search
None
See application file for complete search history.

(56) References Cited

U.S. PATENT DOCUMENTS

| 6,094,625 | A | 7/2000 | Ralston |
| 9,646,571 | B1 | 5/2017 | Côté et al. |
| 9,824,490 | B1 | 11/2017 | Côté et al. |
| 2017/0046877 | A1* | 2/2017 | Hustad ................... G09G 5/003 |
| 2018/0259339 | A1* | 9/2018 | Johnson ................ G01S 13/862 |

OTHER PUBLICATIONS

Author: Smart et al.; Title: "Designing a 3D Cadastral System Demonstrator: A Case Study"; Date: Oct. 2-4, 2018; Publisher: 6th International Fig. 3D Cadastre Workshop; pp. 16 (Year: 2018).*
Author: Blogo Motori; Title: "Pioneer Cyber Navi"; Date: May 10, 2012; Source: https://www.youtube.com/watch?v=c4MxjMzhnFQ (Year: 2012).*

(Continued)

*Primary Examiner* — Jwalant Amin
(74) *Attorney, Agent, or Firm* — Cesari and McKenna, LLP; James A. Blanchette (57) ABSTRACT

In one embodiment, an augmented reality application executing on an augmented reality device accesses a representation of the physical environment. The augmented reality application aligns information that describes near-ground features with the representation of the physical environment. After alignment, the augmented reality application generates an augmented reality view that is displayed on a display device by projecting the near-ground features onto the ground in the representation of the physical environment, generating a virtual plane above the ground that is parallel to the ground and separated therefrom by a distance, projecting the near-ground features onto the virtual plane above the ground, and showing an indicator of visual correspondence that connects at least a portion of the projection of near ground features on the ground and a corresponding portion of the projection of near-ground features on the virtual plane above the ground.

18 Claims, 8 Drawing Sheets

(56) References Cited

OTHER PUBLICATIONS

Author: Pouliot et al.; Title: 3D Cadastres Best Practices, Chapter 5: Visualization and New Opportunities; Date: May 6-11, 2018; Source: https://pdfs.semanticscholar.org/e107/a6acf436855cbd37c2b8861537743bf107c2.pdf?_ga=2.18826041.1266929348.1596477069-223363544.1569789490 (Year: 2018).*

Lee, Kevin, "This New GPS Does Augmented Reality, Makes You Feel Like You're in a Fighter Jet," PCWorld, retrieved from <https://www.pcworld.com/article/255486/this_new_gps_does_augmented_reality_makes_you_feel_like_youre_in_a_fighter_jet.html>, May 11, 2012, one page.

Schall, Gerhard, et al., "Smart Vidente: Advances in Mobile Augmented Reality for Interactive Visualization of Underground Infrastructure," Personal and Ubiquitous Computing, vol. 17, Issue 7, Oct. 2012, pp. 1-25.

U.S. Appl. No. 15/700,742, filed Sep. 11, 2017 by Stéphane Côté et al. for Tool for Onsite Augmentation of Past Events, pp. 1-29.

U.S. Appl. No. 15/709,115, filed Sep. 19, 2017 by Stéphane Côté et al. for Tool for Onsite Augmentation of Reality Meshes, pp. 1-27.

U.S. Appl. No. 16/104,582, filed Aug. 17, 2018 by Stéphane Côté for Techniques for Accurate and Faithful Projections in an Outdoor Augmented Reality View, pp. 1-25.

* cited by examiner

TECHNIQUES FOR DISPLAYING AUGMENTATIONS THAT REPRESENT CADASTRAL LINES AND OTHER NEAR-GROUND FEATURES

BACKGROUND

Technical Field

The present disclosure relates to augmented reality, and more specifically to techniques for displaying augmentations that represent near-ground features (e.g., cadastral lines, routes, surface characteristics, surface assets, etc.)

Background Information

Augmented reality is a useful technology for use in a variety of infrastructure planning, construction and maintenance tasks. It has the potential to decrease planning time requirements, while also minimizing mistakes and increasing safety. In a typical augmented reality application, a worker may hold or wear an augmented reality device, such as a head-mounted display unit (e.g., a Microsoft HoloLens® head-mounted display unit), tablet computer (e.g., a Google Tango® tablet computer), smartphone, etc. An augmented reality application executing on the device uses a camera to capture view of the physical environment (e.g., as a stream of images). A pose determination system (e.g., a number of position and orientation sensors and supporting software) determines the pose of the camera. Based on the pose, the application aligns information (e.g., a three-dimensional (3-D) model or two-dimensional (2-D) drawing, such as a 2-D map) that describes features with the view of the physical environment, and augments the view. The augmentations may take the form of projections upon surfaces in the model. An augmented view of the physical environment is then shown on a display device.

Augmented reality may be used with a variety of types of information that described various types of features. In some cases, the information may describe near-ground features. As used herein, the term "near-ground features" refers to delineations, characteristics, or assets related to the ground or related to appurtenances of the ground. For example, near-ground features may include cadastral lines that delineate property boundaries, building footprints, and related details; routes that delineate a path or course; surface characteristics such as topographic data; and surface assets such as manhole covers, street drains, and the like. The ground may take a variety of different forms, and include various types of surfaces. For example, the ground may include paved surfaces (e.g., roads, parking lots, sidewalks, etc.), vegetated surfaces (e.g., grass, brush, etc.) and barren surfaces (e.g., dirt, rock, etc.). Further, for purposes of this description, ground may also include water surfaces (e.g., the ocean surface, a lake surface, etc.)

Figure 1:
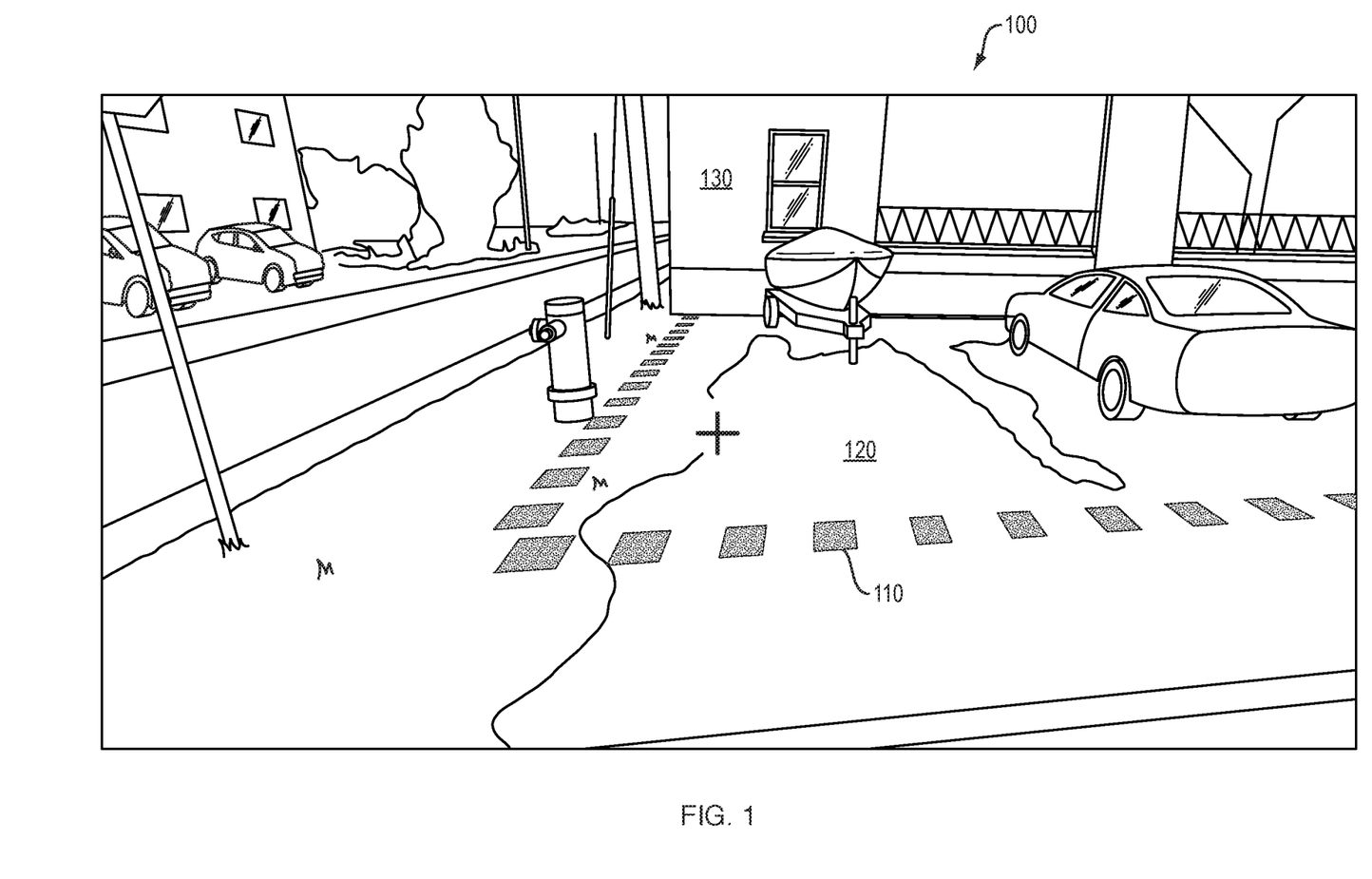
FIG. 1 is an example augmented reality view in which augmentations representing near-ground features (here, cadastral lines) have been projected on the ground.

Often, augmented reality applications represent near-ground features by projecting them upon the ground. The augmented reality application aligns information (e.g., a cadastral map, a sewer and water map, etc.) that describes the near-ground features with the view of the physical environment, and then projects the near-ground features onto the ground in the view of the physical environment, following the topography of the ground. In some cases, the projections appear as virtual paint markings that follow the topography is of the ground as if real paint had been sprayed directly thereon. FIG. 1 is an example augmented reality view 100 in which augmentations representing near-ground features (here, cadastral lines) 110 have been projected on the ground 120. Other objects in the physical environment, such as a house 130, are also shown.

While useful, such an approach to representing near-ground features has a number of shortcomings, including issues of occlusion and low grazing angles. First, objects in the physical environment may occlude augmentations of near-ground features projected on the surface of the ground 120. As can be seen in FIG. 1, the cadastral lines 110 are partially occluded by the building 130, such that only a portion of the property boundary is visible. In some cases, a user may change their location in the physical environment, in order to view the augmentations from a perspective where they are not occluded (e.g., move so that portions of the cadastral lines 110 behind the building 130 come into view). While inconvenient, this at least presents some redress to the issue. In other cases, however, augmentations may be occluded from any practical location in the physical environment (e.g., portions of the cadastral lines 110 that fall within the building 130 may not be visible from any location outside of the building). In such cases, the user may be effectively prevented from viewing the augmentations.

Second, augmentations may be difficult to see because of low grazing angles. Due to the low height of a typical user, distant augmentation may be visible only at very low grazing angles, and thereby appear small and distorted. While a user may change their location in the physical environment to increase the angle and attempt to see a particular augmentation more clearly (e.g., walk towards the particular augmentation), it is often practically impossible to see all augmentations at a reasonable angle at the same time. Accordingly, the user may not be hindered in understanding relationships among various augmentations.

Various workarounds have been proposed to attempt address these issues, in order to enable more widespread use of augmented reality to show near-ground features. One proposed workaround has been to show the augmented view of the physical environment is from a third-person viewpoint, rather than the actual viewpoint of the user. Such an approach, however, may require pre-capture of view of the physical environment from such third-person viewpoint, for example, using a drone. However, drones generally must be operated carefully according to safety regulations and have ranges. Their use often may make augmentation too complicated or expensive to be practical. Alternately, such an approach may require pre-capture of a fully 3-D scene, such that a view from a different viewpoint can be generated. However, manipulating and generating views from a 3-D scene generally requires an augmented reality device having robust processing and memory capabilities. It may also require delicate user input operations to move a virtual camera which defines the different viewpoint. These limitations may make this approach impractical.

Another proposed workaround has been, rather than to augment the view of the physical environment itself, to show a 2-D drawing (e.g., a 2-D map) of the near-ground features adjacent to the view of the physical environment. Such an approach, however, may only be applicable to certain types of augmented reality devices that have scenes large enough to simultaneously display two views side-by-side. Further, it requires mental effort by the user to understand the relationship between the 2-D drawing and the view of the physical environment, and effectively synthesize this information. Still another proposed workaround has been to display augmentations representing near-ground features at locations other than on the ground. However, in such techniques there have not been any indications of relationships or correspondence between the augmentations and the ground. Accordingly, significant mental effort has been required for a user to interpret the augmentations. In some cases, even with great effort a user may be unable to understand how the augmentations relate to objects on the ground. As a result, such techniques have not seen widespread adaptation.

There is a need for improved techniques for displaying augmentations that represent near-ground features (e.g., cadastral lines, routes, surface characteristics, surface assets, etc.). It would be desirable if such techniques could address some of the above noted problems of prior attempts, providing a user interface that is natural and intuitive (without requiring undue mental efforts to understand) and that is suited for use on variety of types of augmented reality devices, which may lack robust processing and memory resources and/or large displays.

SUMMARY

Techniques are provided for displaying augmentations that represent near-ground features (e.g., cadastral lines, routes, surface characteristics, surface assets, etc.) by projecting them on a virtual plane above the ground (e.g., in the sky) and showing an indicator of visual correspondence that relates the projection of near-ground features on the virtual plane above the ground (e.g., in the sky) to locations on the ground. By raising the augmentation above the ground, issues of occlusion and low grazing angles may be avoided. Further, by including indicators of visual correspondence, a natural and intuitive view may be produced that enables a user to readily understand how the augmentations relate to objects on the ground. Such a view may be generated utilizing limited processing and memory resources, and may be suitable for display on a wide variety of different display devices, including those with limited size screens.

In one embodiment, an augmented reality application executing on an augmented reality device accesses a representation of the physical environment that includes ground. The representation may be a view of the physical environment captured by a camera of the augmented reality device or a 3-D reality mesh constructed from images of the physical environment. The augmented reality application aligns information that describe near-ground features with the representation of the physical environment. After alignment, the augmented reality application generates an augmented reality view that is displayed on a display device of the augmented reality device by projecting the near-ground features onto the ground in the representation of the physical environment, generating a virtual plane above the ground that is parallel to the ground and separated therefrom by a distance, projecting the near-ground features onto the virtual plane above the ground, and showing an indicator of visual correspondence that connects at least a portion of the projection of near ground features on the ground and a corresponding portion of the projection of near-ground features on the virtual plane above the ground. The indicator of visual correspondence may be one or more vertical planes that connect the portion of the projection of near ground features on the ground and the corresponding projection of near-ground features on the virtual plane above the ground.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The application refers to the accompanying drawings of example embodiments, of which.

DETAILED DESCRIPTION

Figure 2:
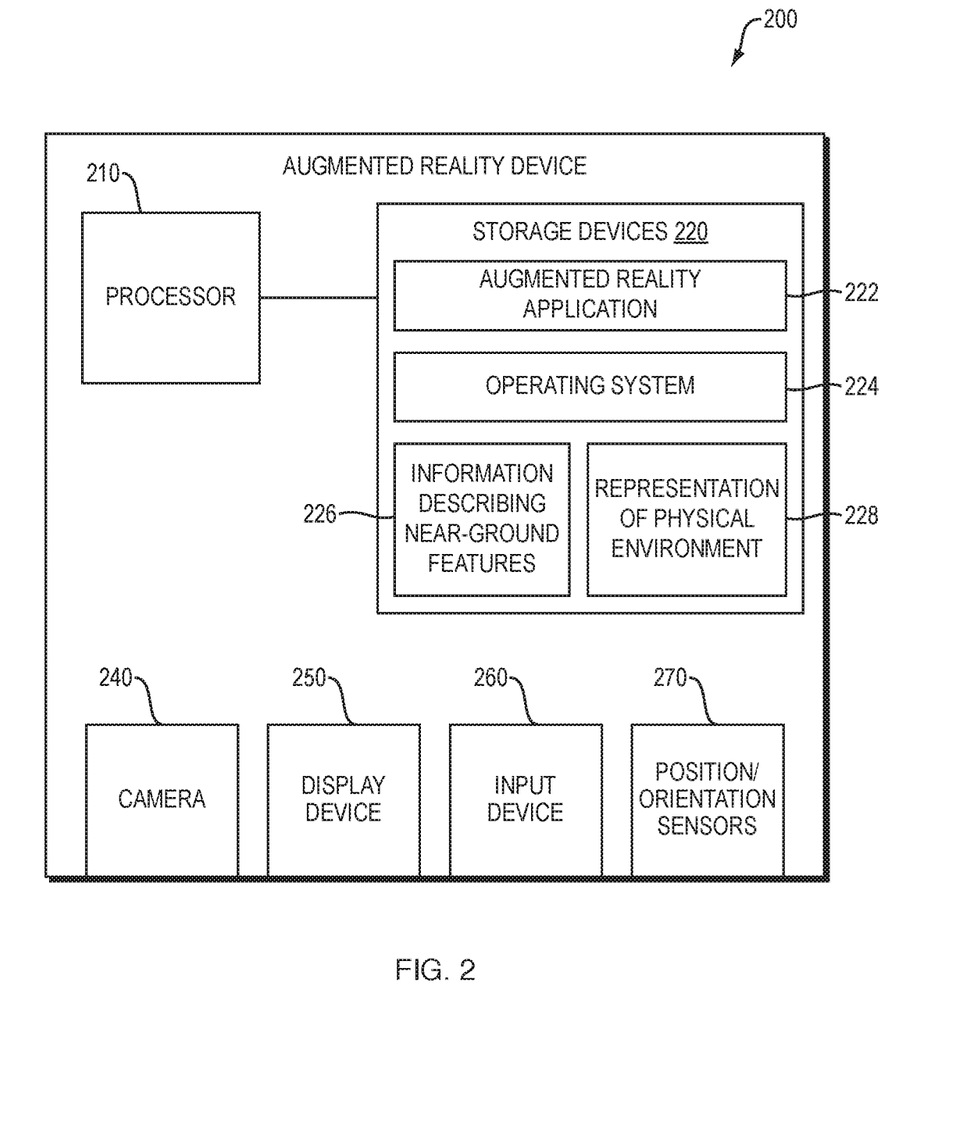
FIG. 2 is a block diagram of an example augmented reality device that may be used with techniques for displaying augmentations that represent near-ground features in an augmented reality view.

FIG. 2 is a block diagram of an example augmented reality device 200 that may be used with techniques for displaying augmentations that represent near-ground features in an augmented reality view. The augmented reality device 200 may be stand-alone mobile device such as a head-mounted display unit (such as the Microsoft HoloLens® head-mounted display unit), a tablet computer, or smartphone. Alternatively, the augmented reality device may be part of a larger mobile system, for example, a head-up display (HUD) system integrated into a vehicle, a navigation console of a marine vessel, a measurement or survey instrument, etc. In still other alternatives, the augmented reality device may be a substantially stationary device, or a part of a substantially stationary system, for example, a desktop computer.

The augmented reality device 200 includes a processor 210 coupled to volatile and non-volatile memory/storage devices 220 that, among other things, store processor-executable instructions and data. The instructions include at least instructions of an augmented reality application 222 and an operating system 224. The data includes at least information that describes near-ground features 226 and a representation of the physical environment 228. The information that describes near-ground features 226 may be a 3-D model, 2-D drawing (e.g., a 2-D map) or another type of data store that includes cadastral lines that delineate property boundaries, building footprints, and related details; routes that delineate a path or course; surface characteristics such as topographic data; surface assets such as manhole covers, street drains, or other qualities. The representation of the physical environment 228 may be a view of the physical environment (e.g., a live image or a stream of images) captured by a camera 140 that is an integral part of the augmented reality device 200 (e.g., in the case of a head-mounted display unit, a tablet computer, etc.) or that is disposed separate from the augmented reality device 200 (e.g., in the case of a desktop computer, navigation console, etc.). Alternatively the representation of the physical environment 228 may be a 3-D reality mesh. As used herein the term "3-D reality mesh" refers to a 3-D polygon mesh constructed from images of the physical environment. A 3-D reality mesh may be created based on pre-captured images by structure-from-motion (SfM) photogrammetry and/or other techniques and stored until needed.

In addition, the augmented reality device 200 further includes a display device 250 (e.g., a stereoscopic optical see-through head-mounted display, a touch screen panel, a non-touch enable liquid crystal display (LCD), etc.) configured to show an augmented reality view including augmentations that represent near-ground features generated by the augmented reality application 222. Likewise, at least one input device 260 (e.g., a touch sensor, a sensor detecting hand gestures, a voice command interface, a keyboard, a mouse, etc.) is provided to receive user selections for interacting with the augmented reality application 222, and the augmented reality view displayed thereby. The augmented reality device 200 may also include one or more position and/or orientation sensors 270, such as a Wi-Fi interface, a global positioning system (GPS) receiver, a beacon-based positioning sensor (e.g., Bluetooth receiver), an orientation sensor, a magnetometer, and the like, whose output is used by the augmented reality application 222 to assist alignment and tracking.

It should be understood that the augmented reality device 200 may include a wide variety of other hardware and software components, and that the above described components are merely illustrative. Further, it should be remembered that the augmented reality device 200 need not be a stand-alone device, and may be a part of a larger system or a distributed system, comprising multiple devices operating together. In general, a variety of distributed, collaborative, and/or remote computing arrangements are possible.

Figure 3:
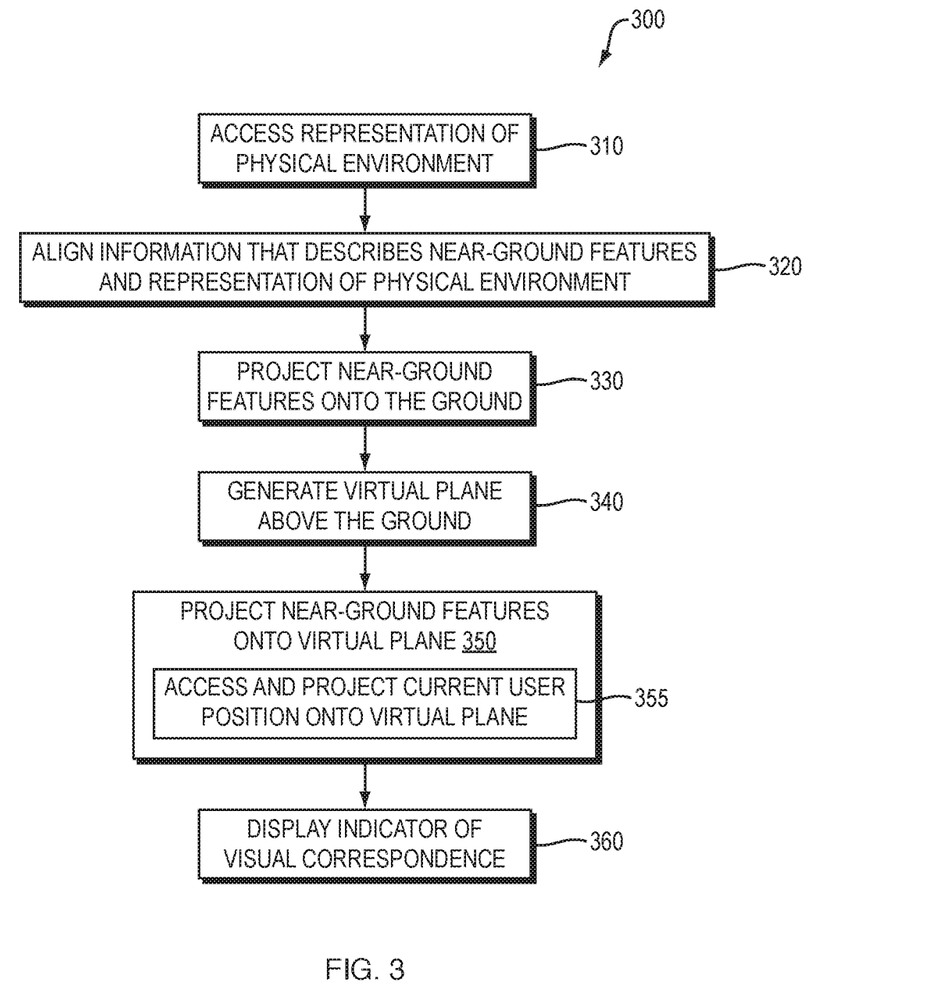
FIG. 3 is a flow diagram of an example sequence of steps for displaying augmentations that represent near-ground features in an augmented reality view.

FIG. 3 is a flow diagram of an example sequence of steps 300 for displaying augmentations that represent near-ground features in an augmented reality view. At step 310, the augmented reality application 222 executing on the augmented reality device 200 accesses a representation of the physical environment 228 (e.g., a view of the physical environment or 3-D reality mesh) that includes the ground. Some portions of the ground may be visible in the representation of the physical environment, while other portions of the ground may be occluded by objects (e.g., buildings) in the physical environment. In an implementation where the representation of the physical environment 228 is a view of the physical environment, step 310 may include operations to capture the view using a camera 240. In an implementation where the representation of the physical environment 228 is a 3-D reality mesh, step 310 may include operations to generate the 3-D reality mesh based on pre-captured images of the physical environment using SfM photogrammetry or other techniques.

At step 320, the augmented reality application 222 executing on the augmented reality device 200 aligns the information that describes near-ground features 226 (e.g., a 3-D model, 2-D drawing such as a 2-D map, etc.) and the representation of the physical environment 228 (e.g., the view of the physical environment or 3-D reality mesh). Such alignment may be performed in a number of different ways depending upon the implementation.

In some implementations, alignment may be performed by manually establishing points of correspondence (control points) in the information that describes near-ground features 226 and the representation of the physical environment 228. The augmented reality application 222 may display the information that describes near-ground features 226 together with the representation of the physical environment 228 (e.g., as a transparent overlay, side-by-side, or in another manner). The information that describes near-ground features 226 may be shown at an approximately correct alignment based on automatically determined data from position and/or orientation sensors 270. The user may be prompted to select control points in the two displays. Because of the use of data from position and/or orientation sensors 270, control points may already be relatively close to each other. Selection of three points is typically sufficient to enable alignment.

In other implementations, alignment may be performed by the augmented reality application 222 using an automatic algorithm, without significant user action. Any of a number of known algorithms may compare the information that describes near-ground features 226 and the representation of the physical environment 228 and attempt to find control points automatically. Alternatively, a number of known algorithms that do not utilize control points may be utilized to automatically perform alignment.

After alignment, the augmented reality application 222 generates an augmented reality view that is displayed on a display device 250 of the augmented reality device 200. To this end, at step 330, the augmented reality application projects the near-ground features from the information (e.g., a 3-D model, 2-D drawing such as a 2-D map, etc.) 226 onto the ground in the representation of the physical environment (e.g., the view of the physical environment or 3-D reality mesh) 228. For example, in an implementation where the representation of the physical environment 310 is a view of the physical environment and the information is a 2-D map including cadastral lines, the augmented reality application 222 may project the cadastral lines onto the ground in the view. Often, one portion of the projections of the near-ground features upon the ground will be visible and another portion occluded by objects (e.g., buildings).

At step 340, the augmented reality application generates a virtual plane in the representation of the physical environment (e.g., the view of the physical environment or 3-D reality mesh) 228 that is above the ground and parallel to it, but separated therefrom by a distance. The virtual plane may be visible in the generated augmented reality view (shown opaque, translucent or in another manner) or hidden in the generated augmented reality view (being used for purpose of projection as discussed below, but not shown itself). The distance between the ground and the virtual plane may be selected manually or automatically. In a manual implementation, the distance may be selected by a user in a user interface of the augmented reality application 222 using an input device 260. In an automatic implementation, the distance may be selected based on a height of one or more objects (e.g., a tallest building, an average height of buildings, etc.) in the physical environment (e.g., 25% greater than the height of the tallest building, twice as high as the average height of buildings, etc.). In some cases, which objects to consider in the automatic distance determination may be based on a current position of a user of the augmented reality device and an orientation of the augmented reality device (e.g., as determined by position and/or orientation sensors 270), such that those objects within a field-of-view (e.g., of camera 240) are considered and those outside of the field-of-view are ignored.

At step 350, the augmented reality application 222 projects the near-ground features from the information (e.g., 3-D model, 2-D drawing, such as 2-D map, etc.) 226 onto the virtual plane in the representation of the physical environment 228. For example, in an implementation where the representation of the physical environment 228 is a view of the physical environment and the information is a 2-D map including cadastral lines, the augmented reality application 222 may project the cadastral lines onto the virtual plane. Unlike the projections upon the ground, the projections upon the virtual plane located a distance above the ground will generally be fully visible (i.e. not occluded by objects such as buildings).

Figure 4:
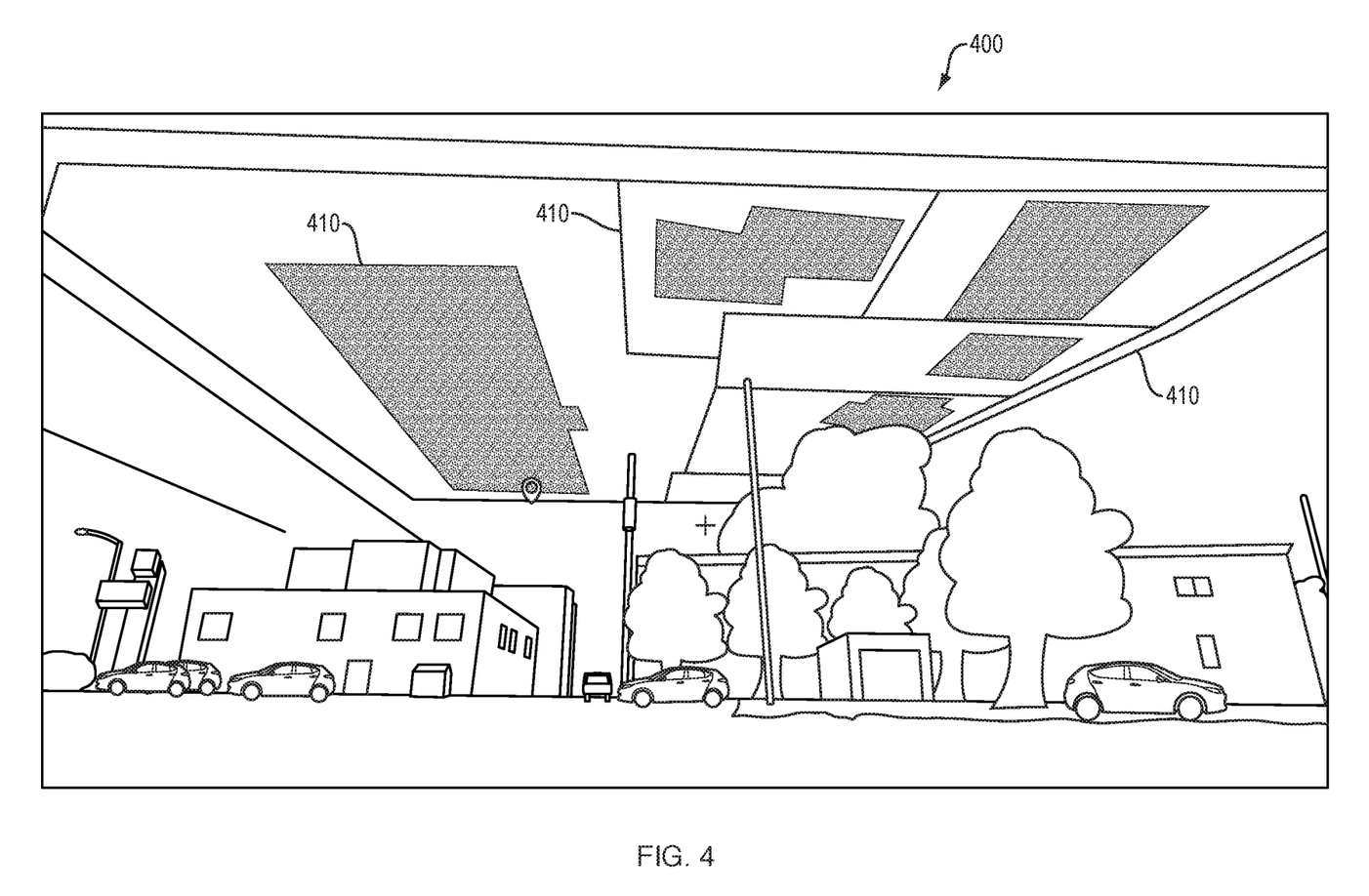
FIG. 4 is an augmented reality view showing projections of near-ground features (here, cadastral lines) onto a virtual plane located a distance above the ground.

At optional sub-step 355, the augmented reality application 222 accesses a current user position and projects an indicator of the current user position (e.g., a location pin symbol, a x-mark, etc.) onto the virtual plane above the ground. The indicator of current user position may assist a user in understanding the relationship between their position and the projections of the near-ground features on the virtual plane. In many implementations, the current user position will coincide with the current positon of the augmented reality device 200. The current positon of the augmented reality device 200 may be continually calculated by the operating system 220 based on data from position and/or orientation sensors 270, and available upon request. In other implementations, the current user position may be determined by the augmented reality application 222 analyzing a point-of-view from which the representation of the physical environment 228 is being shown, and triangulating therefrom the current user position. A wide variety of other alternative techniques are also possible FIG. 4 is an augmented reality view 400 showing projections of near-ground features (here, cadastral lines) 410 onto a virtual plane located a distance above the ground 420. Some cadastral lines 410 represent both property boundaries while others indicate building footprints. As can be seen, the cadastral lines 410 are fully visible (e.g., not occluded) on the virtual plane. However, it may be challenging to understand what properties and buildings the cadastral lines 410 on the virtual plane correspond to, given the remoteness from the ground.

Accordingly, at step 360, the augmented reality application 222 shows an indicator of visual correspondence that connects at least a portion of the projection of near ground features on the ground and a corresponding portion the projection of near-ground features on the virtual plane above the ground, to enable a user to understand the relationship between the two projections. The indicator of visual correspondence facilitates understanding of where the features displayed on the virtual plane relate to on the ground. Depending on the implementation, the indicator of visual correspondence may take a number of different forms. In one implementation, the indicator of visual correspondence is vertical planes that connect the projection of near ground features on the ground and the projection of near-ground features on the virtual plane above the ground. The vertical planes may be patterned (e.g., covered with horizontal lines, vertical lines, repeating shapes such as squares, etc.), translucent, or otherwise displayed.

Figure 5:
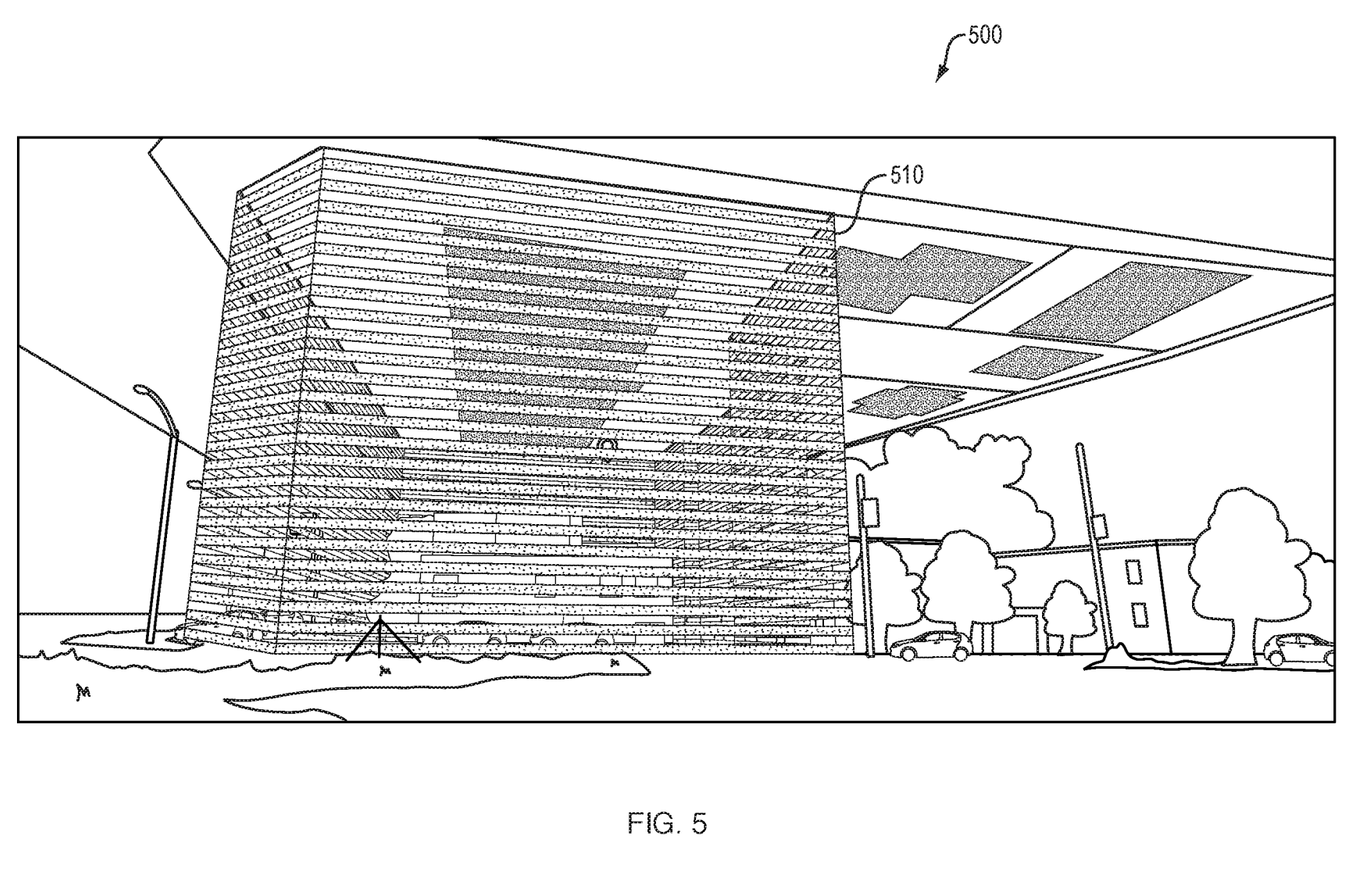
FIG. 5 is an augmented reality view showing vertical planes patterned with horizontal lines that connect a portion of the projection of near ground features on the ground is and a corresponding portion the projection of near-ground features on the virtual plane above the ground.
Figure 6:
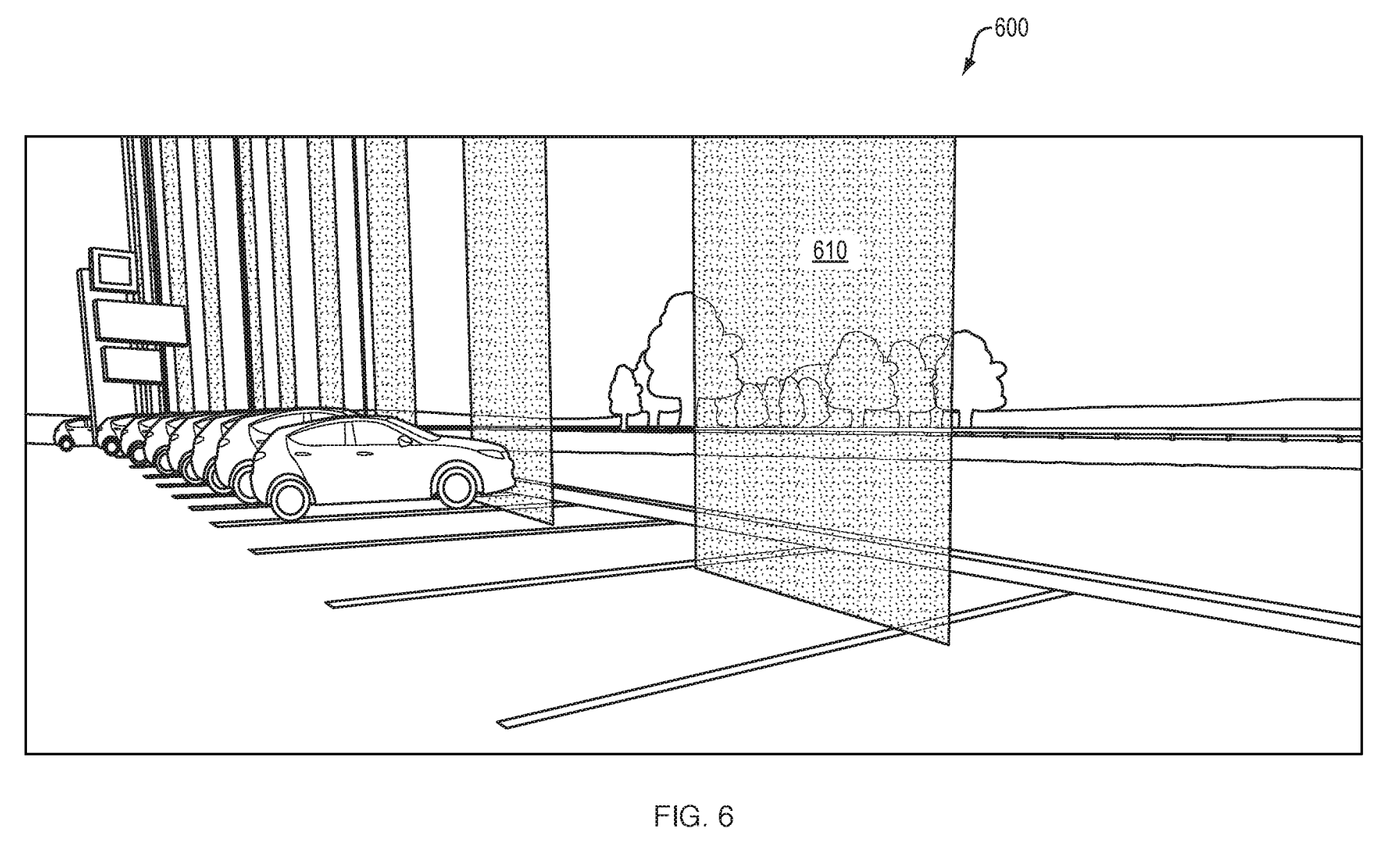
FIG. 6 is an augmented reality view showing vertical planes patterned with vertical lines that connect a portion of the projection of near ground features on the ground and a corresponding portion the projection of near-ground features on the virtual plane above the ground.
Figure 7:
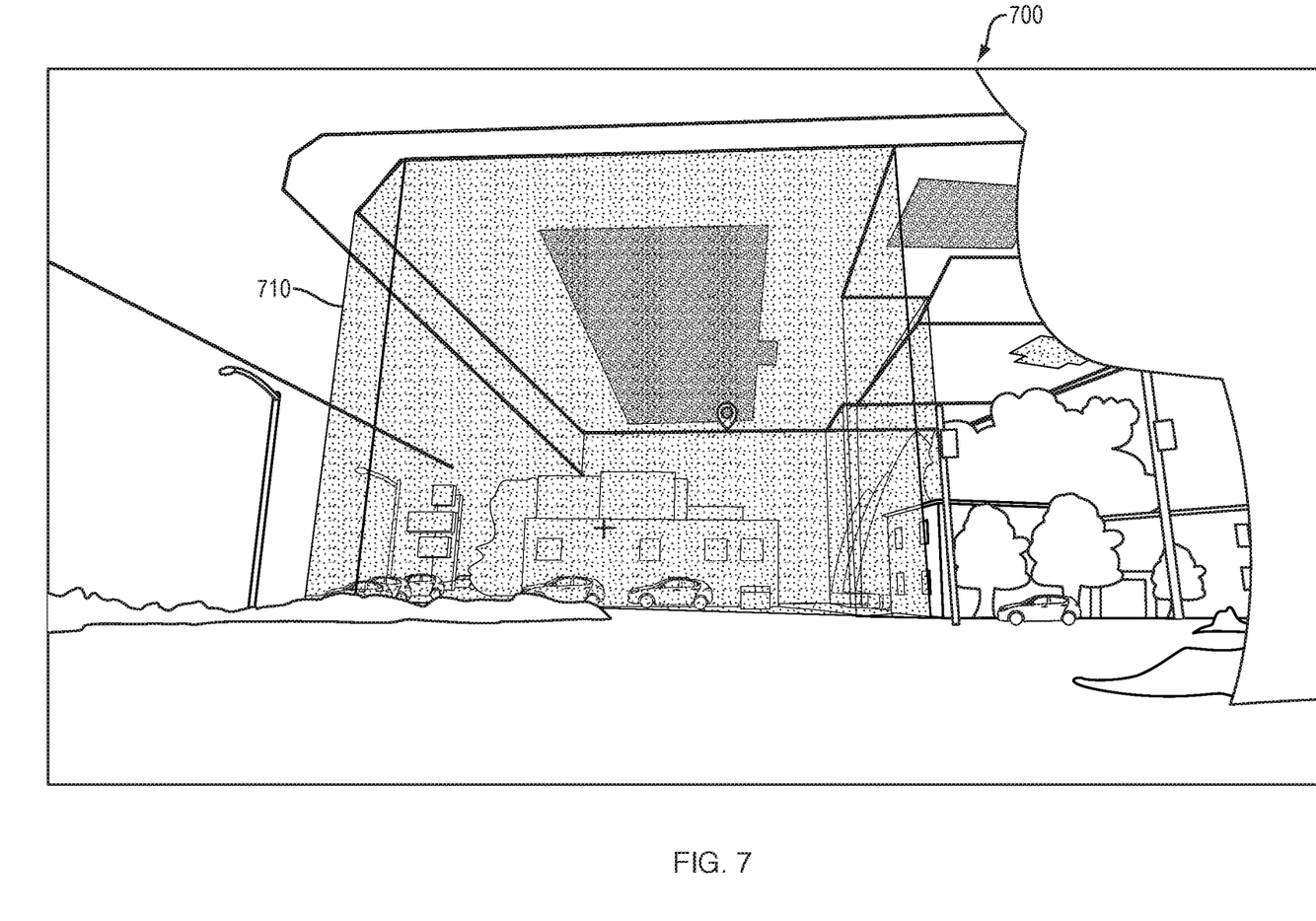
FIG. 7 is an augmented reality view showing translucent vertical planes that connect a portion of the projection of near ground features on the ground and a corresponding portion the projection of near-ground features on the virtual plane above the ground.

FIG. 5 is an augmented reality view 500 showing vertical planes 510 patterned with horizontal lines that connect a portion of the projection of near ground features on the ground and a corresponding portion the projection of near-ground features on the virtual plane above the ground. FIG. 6 is an augmented reality view 600 showing vertical planes 610 patterned with vertical lines that connect a portion of the projection of near ground features on the ground and a corresponding portion the projection of near-ground features on the virtual plane above the ground. Likewise, FIG. 7 is an augmented reality view 700 showing translucent vertical planes 710 that connect a portion of the projection of near ground features on the ground and a corresponding portion the projection of near-ground features on the virtual plane above the ground.

The indicator of visual correspondence (e.g., vertical planes) may be shown for all the time the augmented reality view is being displayed, or only part of the time (e.g., in response user input in the user interface of the augmented reality application 222). Further, the indicator of visual correspondence (e.g., vertical planes) may be shown for all the projections, or for only certain portions of the projections. The portions may be determined in a number of different ways. The portions may be determined user input in the user interface of the augmented reality application 222. For example, a user may use the input device 260 to select a portion of the projection of near-ground features on the ground or an object (e.g., a building) near the portion of the projection those feature. In response, the indicator of visual correspondence may be displayed for the selected portion of the projection. Alternatively, the portions may be determined based on a position and orientation of the augmented reality device 200. For example, the position and/or orientation sensors 270 may determine the augmented reality device 200 is proximate to and oriented towards a portion of the projection. In response, the indicator of visual correspondence may be displayed for that portion of the projection.

The form of the indicator of visual correspondence may be constant for a given implementation, or may dynamically change based on one or more factors, including distance and position. In one implementation, the form may dynamically change based on a distance between an observation point of the augmented reality view (e.g., the positon of the augmented reality device) and the indicator of visual correspondence. For example, when greater than a threshold distance away, the indicator of visual correspondence may take the form of translucent planes, while when closer that the threshold distance, the indicator may take the form of planes patterned with horizontal lines. In another implementation, the form may dynamically change based on whether an observation point of the augmented reality view (e.g., the positon of the augmented reality device) is inside or outside of a particular area. For example, when within the area, the indicator of visual correspondence may take the form of planes patterned with horizontal lines, while when outside the area, the indicator may take the form of planes patterned with vertical lines.

Figure 8:
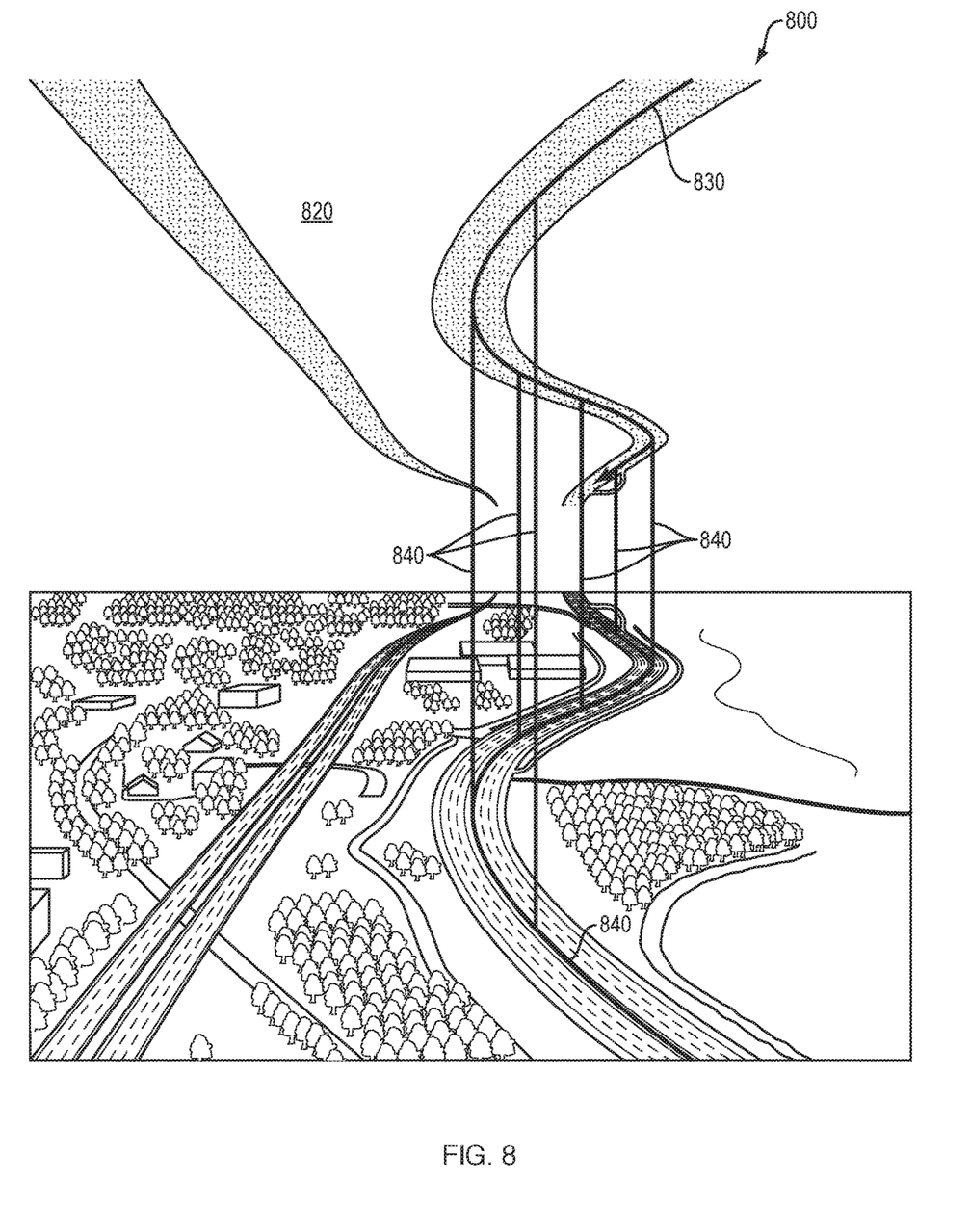
FIG. 8 is an augmented reality view showing an adaptation for displaying a route.

While many of the examples discussed above involve cadastral lines that delineate property boundaries, building footprints, and related details, it should be remembered that the techniques may be used with a variety of other types of near-ground features, including routes, surface characteristics, surface assets and the like. Various adaptations and extensions may be made to the techniques suited to the nature of the near-ground features. For example, in an implementation that displays a route, adaptations may be made to show a map and waypoints. FIG. 8 is an augmented reality view 800 showing an adaptation for displaying a route. A route 810 is projected onto the ground in the representation of the physical environment. A 2D map 820 including the route 830 is projected onto the virtual plane above the ground. Indicators of visual correspondence (here vertical lines) 840 connect portions of the route on the ground and with corresponding portions of the route on the virtual plane above the ground. The indicators of visual correspondence 84 may also indicate waypoints along the route, with each vertical line denoting to a point the user should pass through when traveling the route.

In addition, while many of the examples discussed above involve ground that is land surface (e.g., a paved surface, vegetated surfaces, a barren surface, etc.), it should be remembered that ground may also a water surface (e.g., an ocean surface, a lake surface is etc.) In such cases, the techniques may be adapted for marine purposes, for example, marine navigation. In an implementation adapted for marine navigation, the information that describes near-ground features 226 may describe one or more marine navigational aids such as bathymetry (e.g., channels, reefs, etc.), positions of other vessels, radar data, weather data (e.g., current and predicted positions of weather systems) current position of a user's vessel, or other types of information. In order to facilitate understanding of the scale of such information, an indicator of scale may be projected upon the virtual plane together with the information. In one implementation, the indicator of may be concentric circles centered on a current positon of the user that indicate measures of distance (e.g., circles at 1 nautical mile intervals centered on the current position of the user).

Further, while many of the examples discussed above describe projecting the near-ground features onto the ground and the virtual plane, such that the near-ground features are displayed in two locations, in some alternative implementations, the near-ground features may only be projected upon the virtual plane (e.g., to avoid visual clutter). In such implementations, the indicator of visual correspondence may relate the projection of near-ground features on the virtual plane above the ground to locations on the ground, but not necessarily connect to any projections upon the ground.

Still further, it should be understood that many of examples discussed above may be implemented in software, in hardware, or in a combination thereof. A software implementation may include electronic device-executable instructions stored in a non-transitory electronic device-readable medium, such as a volatile or persistent memory, a hard-disk, a compact disk (CD), or other storage medium. A hardware implementation may include specially configured processors, application specific integrated circuits (ASICs), and/or other types of hardware components. Further, a combined software/hardware implementation may include both electronic device-executable instructions stored in a non-transitory electronic device-readable medium, as well as one or more specially configured hardware components.

In general it should be understood that a wide variety of adaptations and extensions may be made to the techniques describe above without departing from the disclosure's intended spirit and scope. The above descriptions are meant to be taken only by way of example.

What is claimed is:

1. A method for displaying augmentations that represent near-ground features in an augmented reality view, comprising:
    accessing, by an augmented reality device, a representation of a physical environment that includes ground, the representation being a view of the physical environment captured by a camera of the augmented reality device or a 3-D reality mesh constructed from images of the physical environment;
    aligning information that describes near-ground features with the representation of the physical environment, wherein the near-ground features include cadastral lines; and
    generating an augmented reality view from a viewpoint of a user that is displayed on a display device of the augmented reality device by
        projecting the near-ground features onto the ground in the representation of the physical environment,
        generating a virtual plane above the ground that is parallel to the ground is and separated therefrom by a distance, the virtual plane also above the viewpoint of the user,
        projecting the near-ground features onto the virtual plane above the ground, and
        showing an indicator of visual correspondence that connects at least a portion of the projection of near ground features on the ground and a corresponding portion of the projection of near-ground features on the virtual plane above the ground.

2. The method of claim 1, wherein the indicator of visual correspondence is one or more vertical planes that connect the portion of the projection of near ground features on the ground and the corresponding projection of near-ground features on the virtual plane above the ground.

3. The method of claim 2, wherein the vertical planes are displayed with at least one of a pattern or a translucency.

4. The method of claim 3, wherein the pattern comprises horizontal lines, vertical lines, or repeating shapes.

5. The method of claim 1, further comprising:
    receiving a user action on the augmented reality device, wherein the showing an indicator of visual correspondence is performed in response to the user action.

6. The method of claim 1, further comprising:
    determining a distance between an observation point of the augmented reality view and the indicator of visual correspondence,
    selecting a form of the indicator of visual correspondence from a plurality of forms of indicators of visual correspondence based on the distance.

7. The method of claim 1, further comprising:
    projecting an indicator of a current user position onto the virtual plane above the ground.

8. The method of claim 1, wherein the distance is manually selected by a user of the augmented reality device.

9. The method of claim 1, wherein the distance is automatically selected based on a height of one or more objects in the physical environment.

10. The method of claim 1, wherein the near-ground features comprise a route.

11. The method of claim 10, wherein the indicator of visual correspondence also indicates one or more waypoints of the route.

12. The method of claim 1, wherein the near-ground features comprise one or more marine navigational aids selected from the group consisting of bathymetry, position of other vessels, radar data, weather data and current user position.

13. A non-transitory electronic device readable medium having instructions stored thereon, the instructions when executed by one or more processors of one or more electronic devices operable to:
    access a representation of a physical environment that includes ground, the representation being a view of the physical environment captured by a camera or a 3-D reality mesh constructed from images of the physical environment;

align information that describes near-ground features with the representation of the physical environment, wherein the near-ground features include cadastral lines;
generate a virtual plane above the ground that is parallel to the ground and separated therefrom by a distance;
project near-ground features onto the virtual plane above the ground,
display a view showing the projected near-ground features on the virtual plane above the ground; and
show an indicator of visual correspondence in the view that relates the projection of near-ground features on the virtual plane above the ground to locations on the ground,
wherein the virtual plane is also above a viewpoint associated with the view.

14. The non-transitory electronic device readable medium of claim 13, wherein the instructions are further operable to:
project the near-ground features onto the ground in the representation of the physical environment,
wherein the indicator of visual correspondence connects at least a portion of the projection of the near-ground features on the ground to a corresponding portion of the projection of near-ground features on the virtual plane above the ground.

15. The non-transitory electronic device readable medium of claim 13, wherein the indicator of visual correspondence is one or more vertical planes.

16. The non-transitory electronic device readable medium of claim 13, wherein the instructions are further operable to:
determine a current position of a user of the augmented reality device, and
project an indicator of current user position onto the virtual plane above the ground.

17. The non-transitory electronic device readable medium of claim 13, wherein the near-ground features comprise a route.

18. An augmented reality device for displaying augmentations that represent near-ground features in an augmented reality view, comprising:
a camera configured to capture a view of a physical environment including ground;
a display device configured to display an augmented reality view to a user;
a processor; and
a memory coupled to the processor and configured to store instructions for an augmented reality application that are executable on the processor, the instructions for the augmented reality application, when executed, operable to:
align information that describes near-ground features with the view of the physical environment, wherein the near-ground features include cadastral lines; and
generate the augmented reality view from a viewpoint by generating a virtual plane above the ground that is parallel to the ground and separated therefrom by a distance, wherein the virtual plane is also above the viewpoint, projecting the near-ground features onto the virtual plane above the ground, and showing an indicator of visual correspondence that relates the projection of near-ground features on the virtual plane above the ground to locations on the ground.

* * * * *